United States Patent [19]

Newell et al.

[11] 4,042,966
[45] Aug. 16, 1977

[54] MOTOR CONTROL CIRCUIT

[75] Inventors: Dennis E. Newell, El Segundo; Hugh J. Tyler, Santa Ana, both of Calif.

[73] Assignee: Robertshaw Controls Company, Richmond, Va.

[21] Appl. No.: 649,432

[22] Filed: Jan. 15, 1976

[51] Int. Cl.² .............................................. H02H 5/04
[52] U.S. Cl. .................. 361/27; 318/225 R; 318/473; 318/484; 361/29
[58] Field of Search ............................ 361/23, 27, 29; 318/225, 351, 399, 408, 454, 472, 473, 484, 496; 310/166, 184

[56] References Cited
U.S. PATENT DOCUMENTS 2,191,158  2/1940  Potter .............................. 318/473 X
3,974,430  8/1976  Tyler et al. ........................ 361/27 X Primary Examiner—Harry E. Moose, Jr.
Attorney, Agent, or Firm—O'Brien & Marks

[57] ABSTRACT

A motor control circuit for controlling the operation of a motor having main running-speed windings and also start-up windings includes a fixed time delay circuit to energize the main windings after a time delay following energization of the startup windings. In addition a lockout circuit is provided to prevent re-start of the circuit following a particular fault condition.

21 Claims, 3 Drawing Figures

FROM FIG. 2A

MOTOR CONTROL CIRCUIT

BACKGROUND OF THE INVENTION

1. Field of the Invention

The invention relates to control circuits and, in particular, to control circuits for regulating the operation of motors and responsive to a variety of motor running conditions and conditions in the system, such as a refrigeration system, operated by the motor, to provide proper control and safe operation. The invention is particularly adapted for use with motors having two sets of windings, a start-up winding and a running speed winding.

2. Description of the Prior Art

The prior art, as exemplified by U.S. Pats. No. 3,231,809, 3,309,597, 3,345,547, 3,593,075 and 3,819,996, is generally cognizant of motor control systems for controlling motor start up current by providing a series resistor with the motor windings or limiting motor acceleration.

SUMMARY OF THE INVENTION

The present invention is summarized in that a control circuit adapted for use with a dual winding motor includes a first switching device connected to selectively energize a first of the motor windings, a second switching device connected to selectively energize the second of the motor windings, a regulating switch connected to supply power to said first and second switching devices, and a time delay circuit also receiving power through the regulating switch and responsive to the energization of the first switching device to energize said second switching device after a predetermined time delay.

The object of the present invention is to provide a control circuit for a dual winding motor which provides a predetermined time delay between motor winding energization.

It is another object of the invention to provide a control circuit for a motor which inhibits re-start of the motor following a specific fault condition.

It is another object of the invention to provide a control circuit for a motor responsive to a wide variety of motor and system fault conditions and which also regulates the on-time of the motor to acheive a desired thermostatic condition.

Still other objects, features and advantages of the present invention will become apparent from the following description when taken in conjunction with the accompanying drawings.

DESCRIPTION OF THE PREFERRED EMBODIMENT

Figure 1:
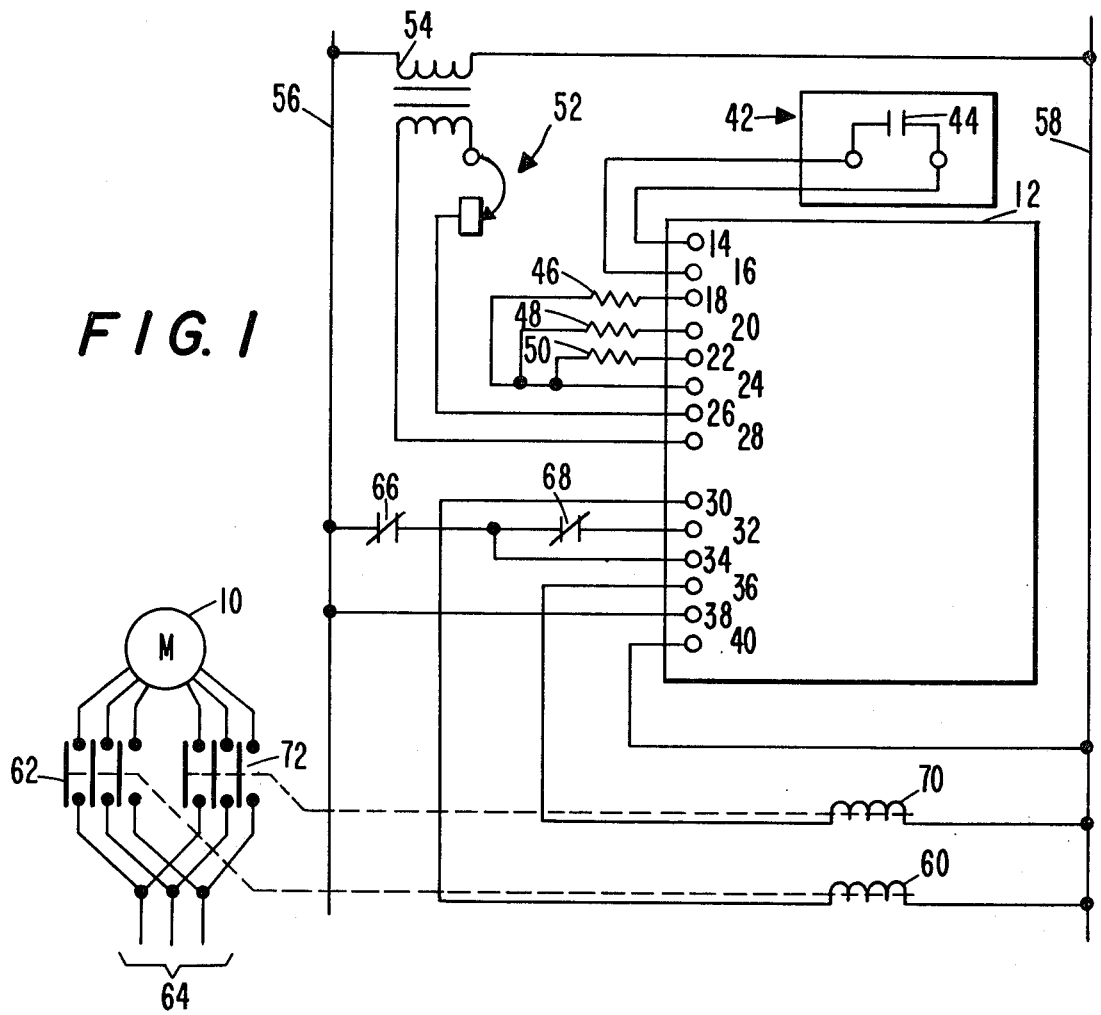
FIG. 1 is a circuit diagram of a control circuit according to the present invention.

As shown in FIG. 1 the present invention is embodied in a load control circuit such as a motor protection circuit suitable for protecting a three phase compressor motor 10 of the type usable in a refrigeration system. The motor 10 is of the type having two sets of field windings, a set of main running speed windings (not shown) and also a set of part start or start-up windings (not shown) which are used to start the motor and have a higher impedance to lessen the initial amperage draw and resultant voltage dip caused by the start of the motor 10. A motor protection circuit housing 12 has thereon a plurality of external terminals 14, 16, 18, 20, 22, 24, 26, 28, 30, 32, 34, 36, 38 and 40. Connected between the terminals 14 and 16 is a normally open lubricating oil pressure sensing switch, generally indicated at 42, which has a pair of contacts 44 which are closed in response to a predetermined pressure in the lubricating oil of the compressor motor 10 being protected. Three thermally sensitive resistances 46, 48 and 50, as for example lengths of positive temperature coefficient wires embedded in respective phase windings of the compressor motor 10, each has one end attached to a respective one of the terminals 18, 20 and 22 and has its other end joined to the terminal 24. Connected to the terminal 26 is one end of a regulating switch 52, typically a condition responsive thermostatic switch, the other end of which is connected to one end of a secondary winding of a transformer 54. The other end of the secondary winding of the transformer 54 is attached to the terminal 28. A primary winding of the transformer 54 is connected between a pair of AC power lines 56 and 58. Connected between the terminal 30 and the AC power line 58 is a main contactor winding 60, which operates a set of three power relay contacts 62 to selectively connect the main windings of the motor 10 to a source of three phase power 64. Connected between the terminal 32 and the AC power line 56 is a series connection of a pair of control switches 66 and 68. In the present embodiment of the invention, the switch 66 is preferrably a low refrigerant pressure switch and the switch 68 is a high limit pressure switch. The terminal 34 is conductively joined to the junction of the control switches 66 and 68. Connected between the terminal 36 and the AC power line 58 is a start-up relay contactor winding 70. The start-up relay contactor winding 70 controls the operation of a set of three power relay contacts 72 which serve to connect the start-up windings of the motor 10 to the three phase source of AC power 64. The terminal 38 is attached to the AC power line 56 and the terminal 40 is attached to the AC power line 58.

Figure 2B:
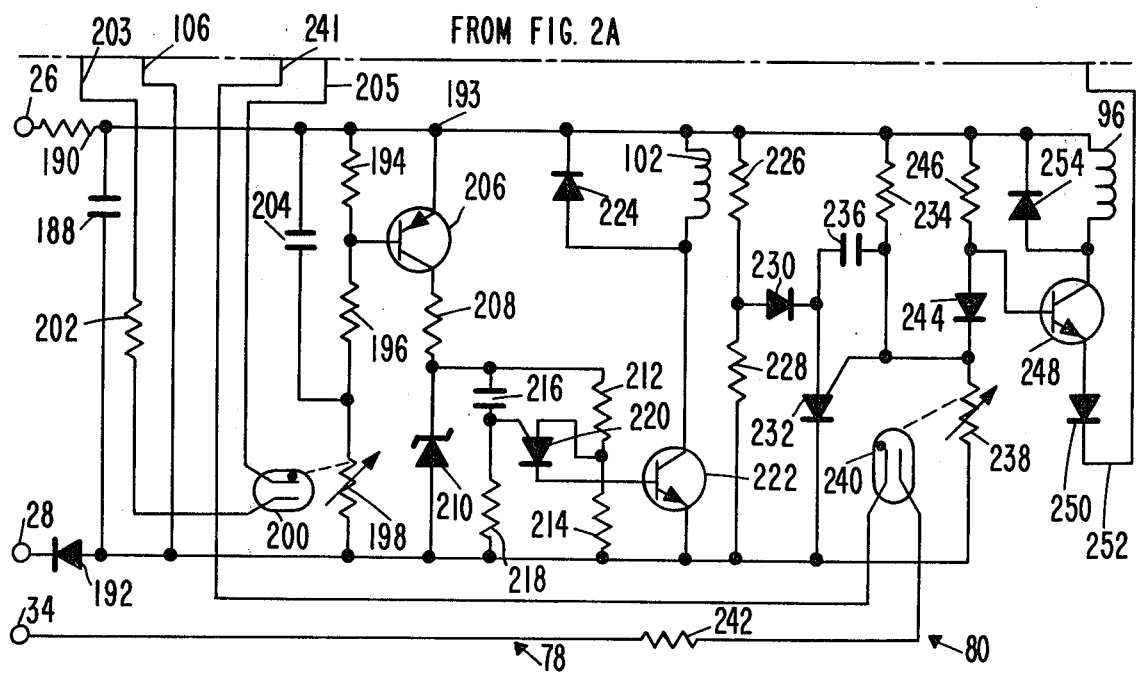
FIGS. 2a and 2b are a circuit diagram of the part of the circuit of FIG. 1 in the housing.

The portion of the motor protection system enclosed in the housing 12 is shown in more detail in FIG. 2. As shown in FIG. 2 the circuitry inside the housing 12 includes an oil pressure protection circuit indicated generally at 74, a thermal protection circuit indicated generally at 76, a time delay circuit indicated generally at 78 and a limit lock-out circuit indicated generally at 80.

Figure 2A:
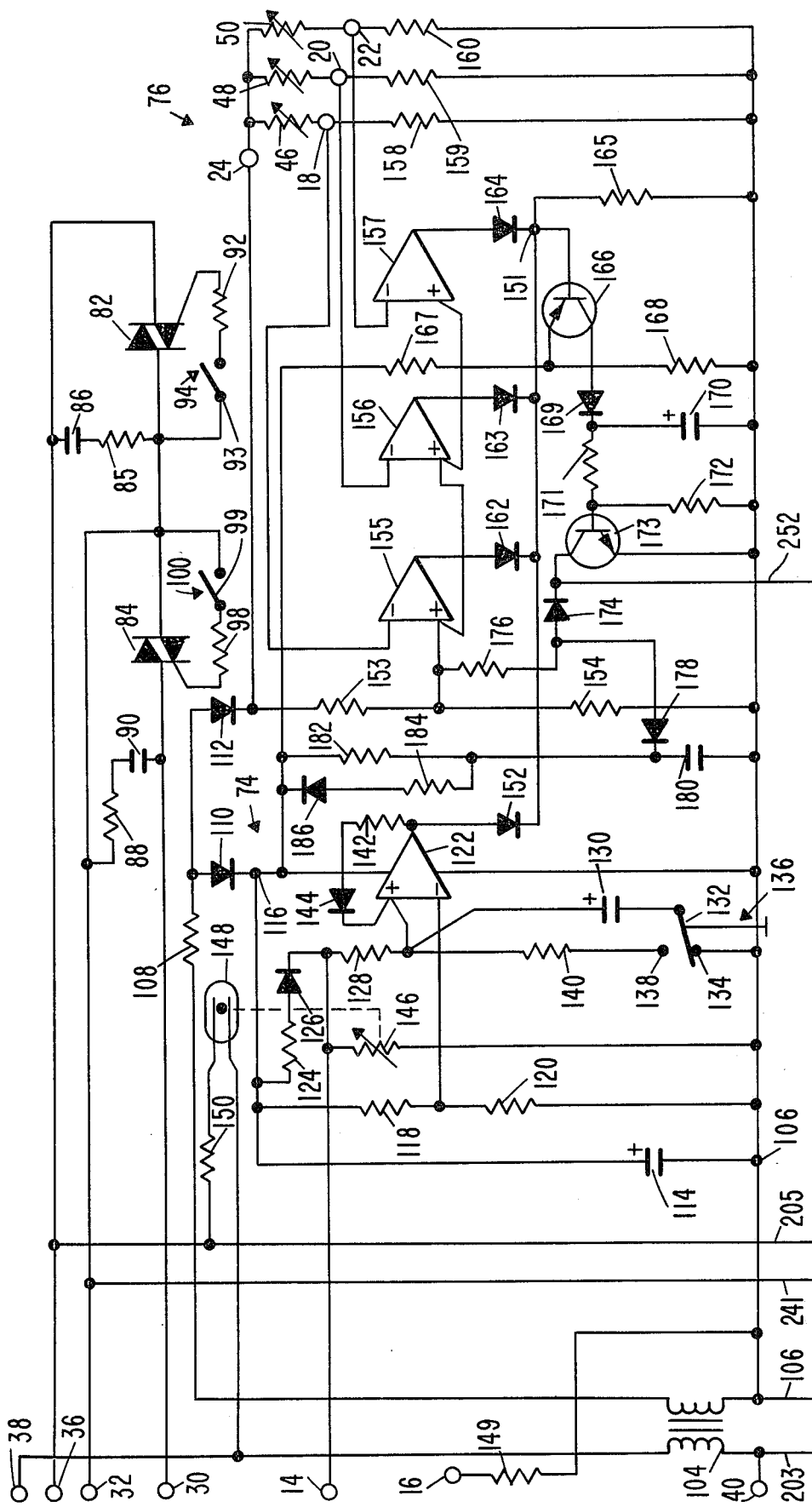

As shown in the FIG. 2A, the triac 82 has one of its main terminals connected to the terminal 36 and its other main terminal connected to one main terminal of a triac 84, the other main terminal of which connects to the terminal 30.

Attached in parallel across the main terminals of the triac 82 is a series circuit of a resistor 85 and a capacitor 86 which have values selected so as to limit the rise time of the voltage across the triac 82 in order to help prevent false triggering. Similarly, connected across the triac 84 in a series circuit also designed to prevent false triggering are a resistor 88 and a capacitor 90. Wired between the gate terminal and one of the main terminals of the triac 82 is a series circuit of a resistor 92 and the contacts 93 of a start-up relay 94. The start-up relay 94 has its contacts 93 actuated by a start-up relay coil 96 in the limit lock-out circuit 80. Connected to the gate terminal of the triac 84 is a series circuit of a resistor 98 and a set of main relay contacts 99 which connect to a main terminal of the triac 84. The main relay contacts 99 form a main relay 100 together with a main relay coil 102. The junction between the main terminals of the triacs 82 and 84 is also connected to the terminal 32.

The transformer 104, which has its primary connected between the terminals 38 and 40, supplies power to the oil pressure protection circuit 74 and the thermal protection circuit 76. The secondary of the transformer 104 is connected at one end to a system ground 106 and at another end to a resistor 108, the other end of which connects to the anodes of a pair of rectifying diodes 110 and 112. A filter capacitor 114 is connected between the cathode of the diode 110 and the ground 106 so as to create a positive voltage at a DC supply voltage node 116. In the oil pressure protection circuit 74, a pair of resistors 118 and 120 are connected in series between the voltage node 116 and the ground 106 and serve as a resistive voltage divider. The junction between the resistors 118 and 120 is connected to the inverting input of an operational amplifier 122 which is also connected to the voltage node 116 and the ground 106 to receive biasing supply voltage. Also wired as a series circuit between the voltage node 116 and the ground 106 is a timing circuit including a dropping resistance 124, a diode 126, a timing resistance 128, a timing capacitor 130 and the contact arm 132 and one contact 134 of an oil pressure reset switch generally indicated at 136. The oil pressure reset switch 136 is a single-pole double-throw manual reset switch with its other contact 138 connected through a resistor 140 to the junction of the resistance 128 and the capacitor 130. The junction of the resistance 128 and the capacitor 130 is also joined to the non-inverting input of the operational amplifier 122. Connected between the output and the non-inverting input of the operational amplifier 122 is a feed back circuit including a resistance 142 and a diode 144. Connected directly between the cathode of the diode 126 and the ground 106 is a light sensitive resistance 146 which is arranged in proximity to a neon lamp 148. The lamp 148, which has one terminal connected to the resistance 150 to the terminal 36 and another terminal connected directly to a terminal 38, drives the light sensitive resistance 146 into a highly conductive state when the lamp 148 is lit and allows it to fall into a less conductive state when the lamp 148 is dim. The junction of the cathode of the diode 126 and the light sensitive resistance 146 is also connected directly to the terminal 14. The output of the operational amplifier 122 is also connected to the anode of a diode 152, the cathode of which is connected to an OR-circuit junction 151. A resistance 155 connects the terminal 16 to the ground 106.

The thermal protection circuit 76 includes wired between the cathode of diode 112 and the ground 106, a series conbination of resistors 153 and 154 which serve as a resistive voltage divider. The junction of the resistors 153 and 154 is connected to the non-inverting input of each of the three operational amplifiers 155, 156 and 157. The cathode of the diode 112 is also connected directly to the terminal 24 and therethrough to one end of each of the thermally sensitive resistances 46, 48 and 50. The terminal 18, which is joined to the thermally sensitive resistance 46, is also joined to the inverting input of the operational amplifier 155. Similarly the terminals 20 and 22 each of which is wired to a respective thermally sensitive resistance 48 or 50, are wired to inverting inputs of the operational amplifiers 156 and 157. Each of the terminals 18, 20 and 22 is also connected to the ground 106 through a respective resistance 158, 159 and 160. Each of the operational amplifiers 155, 156 and 157 has its output connected to the anode of one of diodes 162, 163 and 164, the cathodes of which are connected to the OR-circuit junction 151. The OR-circuit junction 151 is also connected through a resistance 165 to the ground 106 and to the base of a PNP switching transistor 166. The transistor 166 has its emitter tied to the junction of a pair of voltage dividing resistances 167 and 168, the resistance 167 attaching to the voltage node 116 and the resistance 168 attaching to the ground 106. The collector of the 166, is connected through a diode 169 to a filtering capacitor 170 which is also tied to the ground 106. The junction of the diode 169 and the capacitor 170 is connected through a resistance 171 to the base of an NPN transistor 173 which is connected to the ground 106 through a resistor 172. The transistor 173 has its emitter tied directly to the ground 106 and has its collector tied to the cathode of a diode 174, the anode of which is connected through a resistance 176 to the junction of the voltage dividing resistors 153 and 154. The junction of the resistance 176 and the diode 174 is also connected through a diode 178 to one plate of a capacitor 180, the other plate of which is attached to the ground 106. The junction of the diode 178 and the capacitor 180 is also connected through a resistor 182 to the voltage node 116. Wired as a parallel circuit to the resistor 182 is a series combination of a resistor 184 and a diode 186 with the diode 186 having its anode tied to the voltage node 116.

Voltage to the time delay circuit 78 and the limit lock-out circuit 80 is supplied from a capacitor 188, one plate of which is connected through a resistor 190 to the terminal 26 and the other plate of which is connected to the ground 106 which connects through a diode 192 to the terminal 28. The capacitor 188 serves to create a positive supply voltage node 193. Wired as a series circuit across the capacitor 188 is the combination of voltage dividing resistors 194 and 196, and a light sensitive resistance 198. The light sensitive resistances 198 is arranged in proximity to a neon light 200, which hs one of its terminals connected through a current limiting resistor 202 and a conductor 203 to the terminal 40 and another of its terminals connected through a conductor 205 to the terminal 36. The light sensitive resistances 198 is controlled by the neon light 200 such that when the light is on, the resistance 158 becomes highly conductive and when the neon light 200 is dim, the resistance 198 becomes highly resistive. Attached across the series combination of the voltage dividing resistors 194 and 196 is a filtering capacitance 204. The junction of the voltage dividing resistors 194 and 196 is connected to the base of a PNP transistor 206, the emitter of which is connected to the supply voltage 193. The collector of the transistor 206 is connected through a resistor 208 to the cathode of a zener diode 210. The anode of zener diode 210 is joined to the ground 106. Wired in parallel to the zener diode 210 is the series combination of reference voltage dividing resistors 212 and 214. In addition, also wired in parallel to the zener diode 210 is the series connection of an RC timing element including a capacitor 216 and a timing resistor 218. The junction of the timing capacitor 216 and the timing resistor 218 is joined to the gate electrode of a programmable unijunction transistor (PUT) 220. The anode of the PUT 220 is attached to the junction of the voltage dividing resistors 212 and 214. The cathode of the PUT 220 is wired to the base of an NPN switching transistor 222. The switching transistor 222 has its emitter connected directly to the ground 106 and its collector connected to one end of the main relay coil 102. The other side of the main a coil 102 is connected to the supply voltage 193. A diode 224 is connected in parallel to the main relay coil 102 with its anode connected to the supply voltage to protect against transients.

In the limit lock-out circuit 80 a pair of voltage dividing resistors 226 and 228 are wired between the voltage node 193 and the ground 106. The junction of the voltage dividing resistors 226 and 228 is joined to the anode of a light-emitting diode (LED) 230 the cathode of which is joined to the anode of a programmable unijunction transistor (PUT) 232. The cathode of the PUT 232 is attached to the ground 106 and the gate of the PUT 232 is connected through a resistor 234 to the supply voltage 193. A capacitor 236 is wired between the gate and the anode of the PUT 232. The gate of the PUT 232 is also connected to the ground 106 through a light sensitive resistance 238. The light sensitive resistance 238 is located in proximity to a neon lamp 240 which controls the state of conductivity of the light sensitive resistance 238. One side of the lamp 240 is connected by a conductor 241 to the terminal 32 while the other side is connected through a current limiting resistance 242 to the terminal 34. Wired to the junction of the gate of the PUT 232 and the light sensitive resistance 238 is the cathode of a diode 244 the anode of which is attached through a resistor 246 to the voltage node 193. The junction of the diode 244 and the resistor 246 is connected to the base of an NPN switching transistor 248. The transistor 248 has its emitter connected to the anode of a diode 250 the cathode of which is connected by a conductor 252 to the collector of the transistor 173 in the thermal protection circuit 76. The collector of the transistor 248 is connected to one side of the start-up relay coil 96 the other side of which connects to the voltage node 193. A diode 254 is wired in parallel to start-up relay coil 96 with its anode connected to the voltage node 193.

In the operation of the circuit of FIGS. 1 and 2, all the current to the contactor windings 60 and 70 flows through the respective terminals 30 and 36. The current passing through the terminal 30 is controlled by the state of conductivity of the triac 84 and the current through the terminal 36 is controlled by the triac 82. The triacs 82 and 84 are in turn controlled by the respective relays 94 and 100. The relay contacts 93 and 99 of the relays 94 and 100 are operated by the relay coils 96 and 102. In order for the start up relay coil 96 to be energized both of the transistors 248 and 173 must be conductive. In order for the main relay coil 102 to be energized the transistor 222 must be conductive. In the normal operation of the circuit of FIGS. 1 and 2, the transistors 173 and 248 will become energized first thereby activating the strat-up relay coil 96 closing the start-up relay contacts 93, energizing the triac 82 and closing the start-up contactor by energizing the start up contactor winding 70 to close the set of contacts 72. Following a time delay supplied by the time delay circuit 78, the transistor 222 will be driven into conduction thereby energizing the main relay coil 102 closing the main relay contacts 99 turning on the triac 84 to energize the main contactor winding 60 closing the set of contacts 62 to provide running motor current to the motor 10. All of this will be explained in further detail as follows.

The oil pressure protection circuit has as its main functional device the operational amplifier 122. The inverting input of the operational amplifier 122 is maintained at a fixed voltage determined by the voltage dividing resistors 118 and 120. The voltage at the non-inverting input of the operational amplifier 122 is determined by the parallel combination of first the timing resistance 124, the timing capacitance 128 and the contact arm 132, and secondly the light resistance 146. Under normal conditions when the oil pressure sensing circuit 74 is energized, current will flow through the current limiting resistor 124, through the diode 126, and into the timing circuit of the resistance 128 and the timing capacitor 130. The contact arm 132 normally rests in the position shown in FIG. 2 in which one terminal of the plate capacitor 130 is connected through the contact arm 132 and the contact 134 to the ground 106 so that as the circuit is energized, the voltage at the non-inverting input of the operational amplifier 122 slowly rises and the timing capacitor 130 charges. Should the voltage at the non-inverting input of the operational amplifier 122 exceed the voltage at the inverting input, the output of the operational amplifier will be driven high. Normally the output of the operational amplifier is low, thereby allowing the transistor 166 to be conductive, as will be explained. In the normal operation of the motor 10, the lubricating pressure will increase sufficiently shortly after the motor is energized and before the voltage at the non-inverting input of the operational amplifier 122 becomes high to close the oil pressure contacts 44. The closure of the contacts 44 electrically connects the terminal 14 to the terminal 16 thereby lowering the voltage at the non-inverting input of the operational amplifier 122 and preventing the capacitor 130 from charging by inserting the resistor 149 across the combination of the resistance 128 and the capacitor 130. The light sensitive resistance 146 together with the lamp 148 forms an optical isolator which prevents the timing capacitor 130 from charging when no current is being supplied to the motor 10. The lamp 148 is connected between the supply voltage at the terminal 38 and one side of the start up contactor winding 70 at the terminal 36 so that if either of the switches 66 and 68 or the triac 82 is off, a voltage develops across the lamp 148 and it is lit. If the switches 66 and 68 are closed and the triac 82 becomes conductive, the terminals 32 and 36 become electrically joined so that little or no voltage develops across the lamp 148 turning it off. When the lamp 148 is on, the light sensitive resistance 148 is driven to its highly conductive state thereby shorting out the timing capacitor 130 through the timing resistance 128. Thus the non-inverting input to the operational amplifier 122 is held at a low level whenever the motor 10 is not energized thereby keeping the output of the amplifier 122 low. The series connection of the resistor 142 and diode 144 serves as a hysterisis loop for the operational amplifier 122, so that when the output of the operational amplifier 122 goes high the resistor 142 is effectively inserted in series with the resistors 128 and 124 thereby raising the level of the voltage on the non-inverting input of the operational amplifier 122 to prevent twiddling or repeated rapid oscillation of the output of the operational amplifier 122. When the output of the operational amplifier 122 is low the diode 144 insures that the resistor 142 has no effect in the circuit. Should the capacitor 130 charge without the contacts 44 closing or the lamp 148 coming back on, the output of the operational amplifier 122 will go high turning off the motor, as will be explained. This condition will exist until the oil pressure protection circuit 74 is manually reset. This is accomplished by an operator manually actuating the oil pressure reset switch 136 switching the contact arm 132 from the contact 134 to the contact 138 to discharge the capacitor 130 through the resistor 140, to thereby allow the timing sequence to restart.

In the thermal protection circuit 76 each of the operational amplifiers 155, 156 and 157 has a non-inverting input tied to a fixed voltage created at the junction of the voltage dividing resistors 153 and 154. The inverting input to each of the operational amplifiers 155, 156 and 157 is connected to a variable voltage divider created by respective pairs of resistors 46 and 158, 48 and 159, 50 and 160. Since the thermally sensitive resistances 46, 48 and 50 are located inside the phase windings of the motor 10 their resistance will increase in response to an increase in the operational temperature of the motor, the causing the voltage applied to the inverting input of each of the operational amplifiers 155, 156 and 157 to decrease. The values of the resistors 158, 159 and 160 are selected such that under normal operation of the motor 10 the voltage at the inverting input of each of the operational amplifiers 155, 156 and 157 rests on a voltage higher than that created at the non-inverting input by the fixed voltage dividing resistors 153 and 154 so that the output of each of the operational amplifiers normally rests low. Should any phase winding of the motor become excessively hot, respective thermally sensitive resistance will increase in resistance causing the voltage of the inverting input of the operational amplifier to go low, causing the operational amplifier to go high. The output of the operational amplifiers 155, 156 and 157 is connected through a respective one of the diode 162, 163 and 164 to the OR-junction 151, to allow any one of the operational amplifiers 122, 155, 156 and 157 to pull the OR-junction 151 high if the output of that operational amplifier becomes high. Should the OR-junction 151 be driven high it will apply a high voltage to the base of the transistor 166. Since the emitter of the transistor 166 rests at a fixed voltage created by the voltage dividing resisances 167 and 168 the rise of the voltage in the OR-circuit junction 151 causes the transistor 166 to become non-conductive as opposed to its normally conductive state. Normally current flows through the transistor 166, through the diode 169 and charges the capacitor 170, the voltage introduced to the capacitor 170 being fed through the resistances 171 and 172 to apply a base drive to the transistor 173 keeping it conductive. Should the OR-junction 151 go high, the transistor 166 is turned off, and, as the charged is drained from out of the capacitor 170, the transistor 173 is turned off allowing no current to flow therethrough and causing the start up relay coil 96 to be de-activated. Thus the start-up relay coil 96 operating the relay contacts 93 cannot be energized if any of the operational amplifiers 122, 155, 156 or 157 senses either a lack of oil pressure in the motor 10 or an excessive temperature in any of the phase windings of the motor. The resistor 176 and the diode 174 serve to insert the resistor 176 in parallel with the resistor 154 when the transistor 173 is on to lower the voltage at the junction of the resistors 153 and 154. This allows the motor, when operating, to rise to a temperature greater than that at which motor start-up would be inhibited by the thermal protection circuit 76. Thus the thermally sensitive resistors 46, 48 and 50 have to rise to a greater resistance to switch any of the operational amplifiers 155, 156 or 157 high if the transistor 173 is on. In order to allow continuous operation of the motor in the event of a momentary power failure, without requiring that the motor cool to the start-up temperature, the capacitor 180 is included. The capacitor 180 is charged during normal operation by the resistor 182. In the event of a momentary power failure, the capacitor 180 discharges rapidly through the resistor 184 and the diode 186. When the power is restored, momentarily there will be an extremely low voltage at the anode of the diode 178 thereby temporarily inserting the resistor 176 in parallel with resistor 154 to allow the motor to start if it is below the running speed temperature limit. Should the motor not immediately start again for any reason whatsoever, the capacitor 180 will rapidly charge thereby requiring the motor to cool to a sufficiently low temperature so that the value of the voltage at the non-inverting input of the operational amplifiers created by the resistance 154 can be overcome.

The voltage to the capacitor 188 and thereby to the time delay circuit 78 and the limit lock out circuit 80 is supplied through the terminals 26 and 28 from the secondary of the transformer 54 with the regulating thermostatic switch 52 controlling the supply. In the time delay circuit 78, the voltage is divided by the series resistors 194 and 196 and the light sensitive resistance 198. When the lamp 200 is dim, is which occurs when no voltage is being applied to the start-up contactor winding 70, the light sensitive resistance 198 has a relatively high resistance and the base of the transistor 206 is high turning it off. When the relay 94 actuates the triac 82 to energized the start-up contactor 70 and thereby the start-up windings of the motor 10, a voltage develops across the lamp 200 and it turns on forcing the resistance 198 to its highly conductive state. This causes the base of the transistor 206 to be lowered driving it into conduction. The capacitor 204 serves to filter transients caused by flickering of the neon lamp 200 when it is on since it is energized by an AC voltage. When the transistor 206 is on, current flows through the resistor 208, causing a voltage of 12 volts to appear across the reverse biased zener diode 210. The anode of the PUT 220 is kept at a fixed at a fixed voltage by the voltage dividing resistors 212 and 214, while the gate of the PUT 220 starts at 12 volts and drops in voltage due to the action of the RC timing element as the capacitor 216 charges through the resistor 218. When the gate of the PUT 220 drops to a voltage equivalent to one diode drop below the anode voltage, the PUT 220 is triggered into conduction, thereby supplying base drive current to the transistor 222. The transistor 222 energizes the main relay coil 102 which closes the main relay contacts 99 to turn on triac 84, energizing thereby the main contactor winding 60 and the main motor windings. Thus the time delay circuit 78 provides a pre-selectable fixed time delay between the energization of the start-up windings and the main or running speed windings of the motor 10. When the start-up contactor 70 is de-energized, the lamp 200 goes dim and the transistor 206 is turned off. This removes current flow to the PUT 220, thereby turning off the transistor 222 to disable the relay coil 102 to turn the main motor windings in the motor 10 also off.

The limit lock-out circuit 80 functions to lock the motor off following a high limit pressure condition until the control system is reset manually. The neon lamp 240 is connected between the terminals 32 and 34 so as to be turned on when the high limit switch 68 opens. When the lamp 240 is turned on, it drives the light sensitive resistance 238 into a highly conductive state, thereby lowering the voltage at the gate of the PUT 232. Thus the light sensitive resistance 238 and the resistor 246 and 235 act as a variable resistance voltage divider to the gate of the PUT 232. The anode of the PUT 232 rests at a fixed voltage due to the action of the voltage dividing resistors 226 and 228, so that when the voltage at the gate drops, the PUT 232 is triggered into conduction, allowing current flow from both its anode and its gate to ground. The current through the anode comes through the LED 230 through which only negligible leakage current flowed before, thereby lighting the LED 230 to creat a visible display indicating that the limit lock out circuit 80 has been tripped. At the same time the current through the gate of the PUT 232 forward biases the diode 244 to remove all base current from the transistor 248 to turn that transistor off to prevent motor operation. The PUT 232 will remain tripped until the power is removed from the voltage node 193 by the opening of the regulating thermostatic switch 52. The PUT 232 is held in its non-conductive state when power is re-applied to the circuit through the terminal 26 when the high limit switch 68 is closed by the resulting resistive state of the light sensitive resistance 238 causing the gate of the PUT 232 to be high. The capacitor 236 functions to prevent transients from falsely triggering the PUT 232.

Thermostatic control of the motor 10 is also obtained through the transistor 248. For the motor to be energized the transistor 248 must be forward biased and supplied with base drive current through the resistor 246. Since the resulting thermostatic switch 52 controls the voltage supply to the voltage node 193, when the thermostatic switch 52 opens, the transistor 248 and the start up relay coil 96 are de-energized thereby turning off the motor 10. Reclosure of the regulating thermostatic switch 52 will restore power to the voltage node 193, and turn on the transistor 248, as long as the limit switch 68 is closed, to power the start up windings to start the motor and also trigger the time delay circuit 78.

Inasmuch as the present invention is subject to many variations, modifications and changes in detail, it is intended that the foregoing specification and accompanying drawings be interpreted in an illustrative, rather than a limiting sense.

What is claimed is:

1. A control circuit adapted for controlling a dual winding motor comprising
    a first switching device connected to selectively energize a first of the motor windings,
    a second switching device connected to selectively energize the second of the motor windings,
    a regulating switch connected to supply power to said first and second switching devices, and
    a timing delay circuit receiving power through the regulating switch and responsive to the energization of the first switching device to energize said second switching device after a predetermined time delay.

2. A control circuit as claimed in claim 1 wherein the regulating switch is a thermostatic switch.

3. A control circuit as claimed in claim 1 further including an oil pressure sensitive circuit and an thermal protection circuit each of which is connected so as to selectively inhibit operation of said first switching device upon the sensing of a predetermined pressure or temperature.

4. A control circuit as claimed in claim 1 wherein said first switching device is a relay and wherein there is a triac connected so as to be actuatable by said relay to energize the first windings of the motor.

5. A control circuit as claimed in claim 1 wherein said second switching device is a relay and wherein there is a triac connected so as to be actuatable by said relay to energize the second windings of the motor.

6. A control circuit as claimed in claim 1 for controlling a motor having start-up windings and running speed windings wherein said first switching device is connected to selectively energize the start-up windings of the motor and the second switching device is connected to selectively energize the running-speed windings of the motor.

7. In a control circuit adapted for use with a motor having a set of main windings and a set of start-up windings, the combination comprising
    an oil pressure responsive circuit responsive to the lubricant pressure in the motor,
    a thermal protection circuit responsive to the temperature of the motor,
    a first transistor controlled by both the oil pressure responsive circuit and the thermal protection circuit,
    a second transistor,
    first switching means controlled by said first and second transistors to selectively energize the start-up windings of the motor,
    a limit switch responsive to a limit condition on the motor operation,
    a lock-out circuit responsive to the actuation of the limit switch to inhibit conduction of the second transistor to prevent operation of the motor,
    reset means to reset the lock-out circuit,
    a time delay circuit actuated by the energization of the start-up motor windings by the first switching means, and
    second switching means operated by the time delay circuit to energize the main motor windings after a predetermined time delay.

8. A control circuit as claimed in claim 7 wherein the reset means includes a thermostatic switch through which power is supplied to the lock-out circuit and the time delay circuit.

9. A control circuit as claimed in claim 7 wherein an optical isolator is connected to the time delay circuit to actuate that circuit in response to energization of the start-up motor windings.

10. A control circuit as claimed in claim 9 wherein the time delay circuit includes a third transistor and a unijunction transistor which controls the operation of the third transistor which in turn controls the operation of the second switching means.

11. A control circuit as claimed in claim 10 wherein a resistive voltage divider is connected to the anode of the programmable unijunction transistor and an RC timing element is connected to the gate of the programmable unijunction transistor so that it is triggered into conduction after a predetermined time delay following actuation of the resistive voltage divider and the RC timing element.

12. A control circuit as claimed in claim 11 wherein a fourth transistor is connected to provide current flow to the resistive voltage divider and the RC timing element, and the conductive state of the fourth transistor is controlled by the optical isolator.

13. A control circuit as claimed in claim 7 wherein an optical isolator connects the limit switch to the lock-out circuit.

14. A control circuit as claimed in claim 13 wherein a programmable unijunction transistor is included in the lock-out circuit which once triggered becomes conductive until reset by the reset means.

15. A control circuit as claimed in claim 14 wherein a fixed voltage divider is connected to the anode of the programmable unijunction transistor and a variable resistance voltage divider is connected to the gate of the programmable unijunction transistor.

16. A control circuit as claimed in claim 15 wherein the optical isolator includes a lamp connected across the limit switch and a light sensitive resistance located in proximity with the lamp and connected in the variable resistance voltage divider.

17. A control circuit as claimed in claim 16 wherein the second transistor has its base connected to the gate of the programmable unijunction transistor so that when the programmable unijunction transistor is conductive, no base drive is applied to the fourth transistor.

18. A control circuit as claimed in claim 17 wherein a light emitting diode is connected between the fixed relative voltage divider and the anode of the programmable unijunction transistor to provide a visible display when the lock-out circuit is triggered.

19. A control circuit as claimed in claim 7 wherein the first switching means is a relay having a coil and contacts and wherein the first and second transistors are connected in series with the coil of the relay.

20. In a control circuit for a compressor motor in a refrigeration system, the motor having start-up and running-speed windings, the combination comprising
a pair of contactors, a respective one connected to energize each of the start-up and running-speed windings,
a lubricating oil pressure responsive circuit,
a thermally responsive circuit,
first switching means responsive to the lubricating oil pressure responsive circuit and the thermally responsive circuit to actuate the contactor for the start-up windings,
a time delay circuit responsive to the actuation of the contactor for the start-up windings,
second switching means connected to and controlled by the time delay circuit and connected to actuate the contactor for the running-speed windings after a time delay from actuation of the start-up windings,
a thermostatic switch through which power is supplied to both the first and second switching means to regulate motor operation to achieve the desired temperature condition,
a limit switch connected in series with the motor contactors and responsive to a high refrigerant pressure to prevent motor operation, and
a lock-out circuit connected to the first switching means and receiving power through the thermostatic switch and responsive to the operation of the limit switch to prevent motor operation until reset by the thermostatic switch.

21. In a control circuit adapted for use with a motor usable as a compressor in a refrigeration system, the motor having a set of main running-speed windings and a set of start-up winding, the combination comprising
a first contactor through which power is transmitted to the start-up windings of the motor,
a second contactor through which power is transmitted to the main windings of the motor,
first and second triacs each connected to control a one of the first and second contactors,
first and second relays each connected to control a one of the first and second triacs and each having a coil,
first and second transistors connected in a series circuit with the coil of the first relay such that if both of the first and second transistors are conductive, the relay coil will be energized,
a third transistor connected in series with the coil of the second relay to control the operation thereof,
an OR-circuit junction controlling the state of conductivity of the first transistor to turn it off when a voltage signal is created thereat,
a plurality of thermally sensitive resistances imbedded in the motor,
a respective operational amplifier connected to each of the thermally sensitive resistances and responsive to the resistances thereof to create a voltage signal at the OR-circuit junction when a high temperature condition exists,
a lubricating oil pressure responsive switch,
an oil pressure protection timing circuit,
an operational amplifier receiving input from the oil pressure responsive switch and the oil pressure timing circuit to create a voltage at the OR-circuit junction if the oil pressure responsive switch doesn't close within a fixed timing period following motor start-up,
a first programmable unijunction transistor controlling the operation of the third transistor,
an RC timing element connected to the first unijunction transistor to trigger it after a time delay,
a fourth transistor controlling current flow to the time delay means,
a first optical isolator responsive to the energization of the first contactor to actuate the fourth transistor to actuate the RC timing element,
a second programmable unijunction transistor controlling the operation of the second transistor,
a thermostatic switch connected to supply power to the first and second relay coils, the second, third and fourth transistors and the first and second unijunction transistors,
a limit switch connected in series with the first and second triacs to prevent motor operation upon the exceeding of a predetermined limit condition,
a second optical isolator connected to the second unijunction transistor to trigger the second unijunction transistor into conduction to lock out operation of the second transistor and thereby the motor upon the opening of the limit switch,
biasing means to rest the second unijunction transistor after power is removed and restored by operation of the thermostatic switch, and
a light emitting diode connected to the second unijunction transistor to provide a visual display when the transistor is in its triggered state.

* * * * *